United States Patent
Choi

(10) Patent No.: US 12,117,058 B2
(45) Date of Patent: *Oct. 15, 2024

(54) ELECTRONIC PARKING BRAKE APPARATUS

(71) Applicant: HYUNDAI MOBIS CO., LTD., Seoul (KR)

(72) Inventor: Moo Jin Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,635

(22) Filed: Jul. 19, 2023

(65) Prior Publication Data

US 2023/0358286 A1 Nov. 9, 2023

Related U.S. Application Data

(63) Continuation of application No. 17/471,817, filed on Sep. 10, 2021, now Pat. No. 11,746,845, which is a
(Continued)

(30) Foreign Application Priority Data

Oct. 17, 2016 (KR) .......................... 10-2016-0134419

(51) Int. Cl.
*F16D 51/10* (2006.01)
*B60T 13/74* (2006.01)
(Continued)

(52) U.S. Cl.
CPC ............ *F16D 65/22* (2013.01); *B60T 13/741* (2013.01); *F16D 51/10* (2013.01); *F16D 51/12* (2013.01);
(Continued)

(58) Field of Classification Search
CPC ............. F16D 2125/20; F16D 2125/22; F16D 2125/40; F16D 2125/52; F16D 2125/58;
(Continued)

(56) References Cited

U.S. PATENT DOCUMENTS 3,788,430 A 1/1974 Hurt
3,835,961 A * 9/1974 Troester ................ F16D 65/567
188/71.9
(Continued)

FOREIGN PATENT DOCUMENTS

EP 1522756 A1 * 4/2005 ............. F16D 65/18
FR 2885658 A1 11/2006
(Continued)

OTHER PUBLICATIONS

Office Action issued in corresponding Korean Patent Application No. 10-2016-0134419 dated Jan. 18, 2018.
(Continued)

*Primary Examiner* — Vishal R Sahni
(74) *Attorney, Agent, or Firm* — Morgan, Lewis & Bockius LLP

(57) ABSTRACT

An EPB (Electronic Parking Brake) apparatus may include: a housing unit; a motor unit mounted in the housing unit; a worm wheel gear unit engaged and rotated with the motor unit; a piston unit connected with a brake shoe; and a nut unit mounted on the worm wheel gear unit, coupled to the piston unit, and moved by the rotation of the worm wheel gear unit so as to pressurize the piston unit. The housing unit is deformed by the movement of the piston unit and restricts the operation of the motor unit.

16 Claims, 9 Drawing Sheets

Related U.S. Application Data continuation of application No. 16/506,381, filed on Jul. 9, 2019, now Pat. No. 11,143,254, which is a continuation of application No. 15/639,536, filed on Jun. 30, 2017, now Pat. No. 10,378,603.

(51) Int. Cl.

| | | |
|---|---|---|
| *F16D 51/12* | (2006.01) | |
| *F16D 65/18* | (2006.01) | |
| *F16D 65/22* | (2006.01) | |
| *F16D 121/24* | (2012.01) | |
| *F16D 125/40* | (2012.01) | |
| *F16D 125/52* | (2012.01) | |

(52) U.S. Cl.
CPC ........ F16D 65/183 (2013.01); *B60T 2270/40* (2013.01); *F16D 2121/24* (2013.01); *F16D 2125/40* (2013.01); *F16D 2125/52* (2013.01)

(58) Field of Classification Search
CPC ......... F16D 2125/582; F16D 2125/585; F16D 65/08; F16D 65/22; F16D 65/56; F16D 65/561; F16D 65/18; F16D 65/183; F16D 2129/10; F16D 51/22; F16D 51/50; F16D 2121/24; F16D 51/10; F16D 51/12; B60T 13/741

See application file for complete search history.

(56) References Cited

U.S. PATENT DOCUMENTS

| | | | | |
|---|---|---|---|---|
| 3,882,442 | A * | 5/1975 | Hubbard | ............... B60T 13/741 338/41 |
| 4,355,708 | A | 10/1982 | Papagni | |
| 5,125,483 | A | 6/1992 | Kitagawa et al. | |
| 6,607,251 | B2 | 8/2003 | Baumgartner et al. | |
| 6,969,127 | B2 * | 11/2005 | Suzuki | ................. B60T 13/741 303/20 |
| 10,378,603 | B2 | 8/2019 | Choi | |
| 11,143,254 | B2 | 10/2021 | Choi | |
| 11,746,845 | B2 * | 9/2023 | Choi | ..................... F16D 65/183 188/78 |
| 2004/0201270 | A1 | 10/2004 | Suzuki et al. | |
| 2005/0252736 | A1 | 11/2005 | Leiter et al. | |
| 2006/0278477 | A1 | 12/2006 | Balz et al. | |
| 2007/0151818 | A1 * | 7/2007 | Linhoff | ................... F16D 65/14 188/162 |
| 2007/0158148 | A1 | 7/2007 | Ohtani et al. | |
| 2008/0257661 | A1 * | 10/2008 | Tristano | .................. F16D 65/18 188/72.6 |
| 2008/0283345 | A1 * | 11/2008 | Balz | ........................ F16D 65/18 188/72.6 |
| 2010/0126811 | A1 | 5/2010 | Kim | |
| 2011/0308898 | A1 * | 12/2011 | Shiraki | ................. B60T 13/741 188/72.4 |

FOREIGN PATENT DOCUMENTS

| | | |
|---|---|---|
| JP | 2009-092092 A | 4/2009 |
| JP | 4800767 B2 | 10/2011 |
| KR | 10-2013-0141073 A | 12/2013 |

OTHER PUBLICATIONS

Non-final Office Action issued in corresponding U.S. Appl. No. 15/639,536 dated Sep. 6, 2018.
Non-final Office Action issued in corresponding U.S. Appl. No. 15/639,536 dated Feb. 20, 2019.
Notice of Allowance issued in corresponding U.S. Appl. No. 15/639,536 dated May 17, 2019.
Non-final Office Action issued in corresponding U.S. Appl. No. 16/506,381 dated Nov. 10, 2020.
Final Office Action issued in corresponding U.S. Appl. No. 16/506,381 dated Mar. 31, 2021.
Notice of Allowance issued in corresponding U.S. Appl. No. 16/506,381 dated Jun. 10, 2021.
Notice of Allowance issued in corresponding U.S. Appl. No. 17/471,817 dated Apr. 20, 2023.
Office Action issued in corresponding U.S. Appl. No. 17/471,817 dated Nov. 30, 2022.

* cited by examiner

ELECTRONIC PARKING BRAKE APPARATUS

CROSS-REFERENCES TO RELATED APPLICATION

This application is the continuation application of U.S. patent application Ser. No. 17/471,817, filed on Sep. 10, 2021, which claims priority from and the benefit of Korean Patent Application No. 10-2016-0134419, filed on Oct. 17, 2016, which is hereby incorporated by reference for all purposes as if set forth herein.

BACKGROUND

Field

Exemplary embodiments relate to an electronic parking brake (EPB) apparatus, and more particularly, to an electronic parking brake apparatus which is capable of recognizing a brake release even though a sensor is removed, thereby reducing a manufacturing cost and weight.

Discussion of the Background

In general, an EPB refers to an apparatus for operating a parking brake using the force of a driving motor without a driver's force, wherein the parking brake is installed to prevent movement of a parked vehicle.

When the motor of the EPB is driven to rotate a worm gear, a worm wheel gear engaged with the worm gear is rotated to move a piston. Then, a parking brake is operated or released.

In the related art, in order to sense the operation of the motor, a separate sensor is mounted to recognize a release of the parking brake. However, the mounting of the sensor increases the weight and cost of the system. Thus, there is a demand for a structure capable of solving such a problem.

The related art of the present invention is disclosed in Korean Patent Publication No. 2013-0141073 published on Dec. 26, 2013 and entitled "Sensor and EPB having the same".

The above information disclosed in this Background section is only for enhancement of understanding of the background of the inventive concepts and, therefore, it may contain information that does not constitute prior art.

SUMMARY

Exemplary embodiments of the inventive concepts provide an electronic parking brake apparatus which is capable of recognizing a brake release even though a sensor is removed, thereby reducing manufacturing cost and weight.

Additional features of the exemplary embodiments will be set forth in the description which follows, and in part will be apparent from the description, or may be learned by practice of the inventive concepts.

In one exemplary embodiment, an EPB apparatus may include: a housing unit; a motor unit mounted in the housing unit; a worm wheel gear unit engaged and rotated with the motor unit; a piston unit being in contact with a brake shoe; and a nut unit mounted on the worm wheel gear unit, coupled to the piston unit, and moved by the rotation of the worm wheel gear unit so as to pressurize the piston unit, wherein the housing unit is deformed by the movement of the piston unit and restricts the operation of the motor unit.

The housing unit may include: a motor mounting part covering the motor unit; a gear mounting part covering the worm wheel gear unit; and a piston mounting part extends from the gear mounting part and covering the piston unit.

The inner surface of the motor mounting part may have an angled shape.

The gear mounting part may have a smaller inner diameter than the piston mounting part. When a stepped part formed by a difference in inner diameter between the gear mounting part and the piston mounting part is pressurized, the motor mounting part may be deformed to pressurize the motor unit.

The motor unit may include: a motor driver mounted in the housing unit; a motor shaft rotated when a current is applied to the motor driver, and transmitting power to the worm wheel gear unit; and a first controller configured to stop the operation of the motor driver when the current value applied to the motor driver is equal to or more than a preset current value.

The motor unit may further include a second controller configured to stop the operation of the motor driver when the first controller malfunctions.

The second controller may stop the operation of the motor driver when the motor driver is driven for a time exceeding a preset driving time.

The piston unit may include: a piston body part opened at one side thereof and having the nut unit embedded therein; a piston pressing part formed at the other side of the piston body part, and pressing the brake shoe; and a piston lid part installed at the one side of the piston body part so as to prevent a separation of the nut unit.

The piston body part may include: a body cylinder covering the nut unit; and a body protrusion formed at one end of the body cylinder and engaged with the piston lid part.

The piston pressing part may protrude from the other part of the body cylinder, and have a pressing groove into which the brake shoe is inserted.

The piston lid part may include: a lid ring through which the worm wheel gear unit is passed and to which the nut unit is locked; and a lid protrusion formed on the lid ring part and coupled to the body protrusion part.

The piston unit may be disposed at either side of the worm wheel gear unit.

The nut unit may include: a pair of spring parts; a pair of plate parts disposed at both sides of the pair of spring parts, respectively; a nut support part supporting any one of the plate parts; and a nut coupling part supporting the other one of the plate parts, and screwed to the worm wheel gear unit so as to move in the axial direction of the worm wheel gear unit.

The pair of spring parts may include a pair of disk-springs which face each other and are pressed against each other by an external force.

The nut coupling part may be coupled to the nut support part through the plate parts and the spring parts.

The nut coupling part may include: a coupling penetration part installed through the spring parts and the plate parts, and coupled to the nut support part; and a coupling locking part protruding from the coupling penetration part so as to be in contact with the plate part.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the inventive concepts

DETAILED DESCRIPTION OF THE ILLUSTRATED EMBODIMENTS

Figure 1:
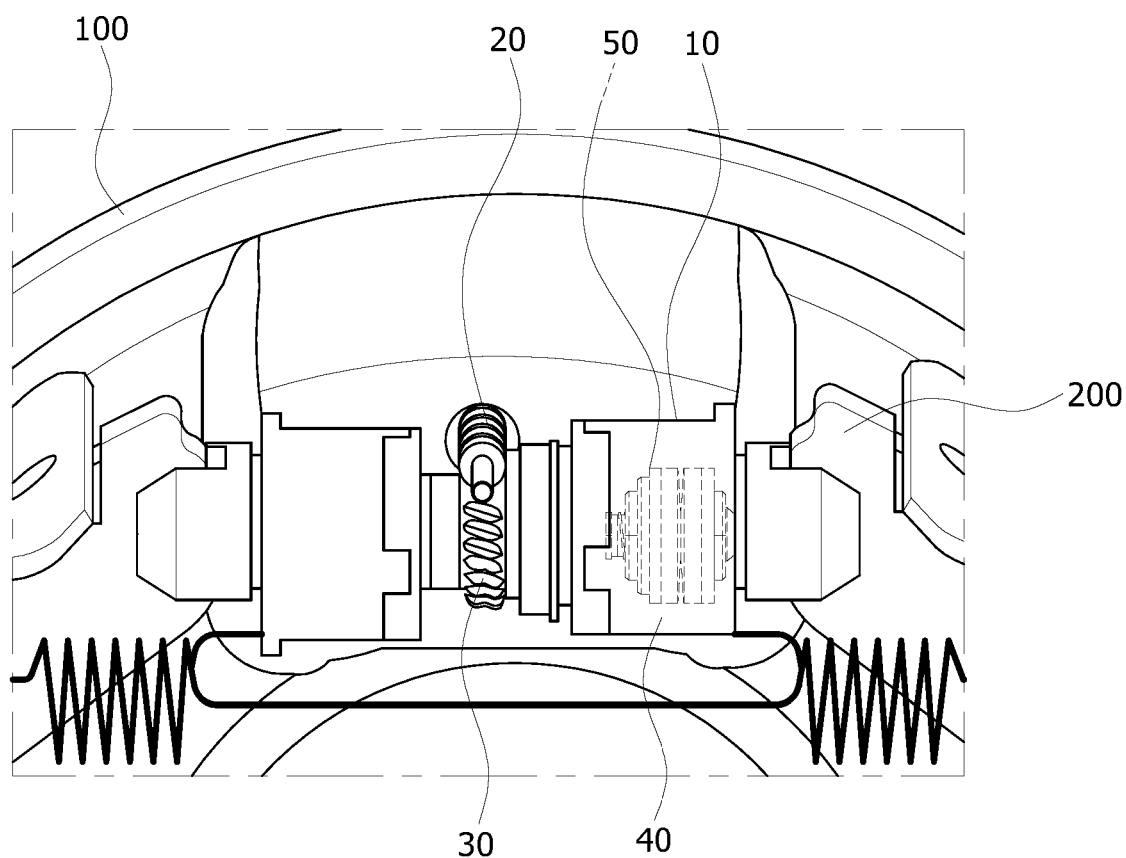
FIG. 1 is a diagram schematically illustrating an EPB apparatus in accordance with an exemplary embodiment of the inventive concepts.

The inventive concepts are described more fully hereinafter with reference to the accompanying drawings, in which exemplary embodiments of the inventive concepts are shown. This inventive concept may, however, be embodied in many different forms and should not be construed as limited to the embodiments set forth herein. Rather, these exemplary embodiments are provided so that this disclosure is thorough, and will fully convey the scope of the inventive concepts to those skilled in the art. Like reference numerals in the drawings denote like elements.

Various advantages and features of the inventive concepts and methods accomplishing thereof will become apparent from the following description of exemplary embodiments with reference to the accompanying drawings. However, the inventive concepts are not limited to the exemplary embodiments set forth herein but may be implemented in many different forms. The exemplary embodiments may be provided so that the disclosure of the inventive concepts will be complete, and will fully convey the scope of the inventive concepts to those skilled in the art and therefore the inventive concept will be defined within the scope of claims. Like reference numerals throughout the description denote like elements. Unless defined otherwise, it is to be understood that all the terms (including technical and scientific terms) used in the specification has the same meaning as those that are understood by those who are skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ).

Unless particularly described to the contrary, the term "comprise", "configure", "have", or the like, which are described herein, will be understood to imply the inclusion of the stated components, and therefore should be construed as including other components, and not the exclusion of any other elements.

Exemplary embodiments of the inventive concepts will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the inventive concepts into account and can be changed according to the custom or intention of users or operators. Therefore, definition of the terms should be made according to the overall disclosures set forth herein.

FIG. 1 is a diagram schematically illustrating an EPB apparatus in accordance with an exemplary embodiment. Referring to FIG. 1, the EPB apparatus 1 in accordance with the exemplary embodiment may include a housing unit 10, a motor unit 20, a worm wheel gear unit 30, a piston unit 40 and a nut unit 50.

The housing unit 10 may be mounted on a wheel 100, and the motor unit 20 may be mounted in the housing unit 10 and provide power to the worm wheel gear unit 30. The piston unit 40 may be disposed at either side of the worm wheel gear unit 30, and constrained by a brake shoe 200.

The nut unit 50 is mounted on the worm wheel gear unit 30 and inserted into the piston unit 40. The nut unit 50 may be moved depending on whether the worm wheel gear unit 30 is rotated, and pressurize the piston unit 40.

For example, when the worm wheel gear unit 30 is rotated in one direction, the nut unit 50 may pressurize the piston unit 40 while being moved toward the brake shoe 200. When the worm wheel gear unit 30 is rotated in the other direction, the nut unit 50 may pressurize the piston unit 40 while being moved toward the worm wheel gear unit 30.

Figure 2:
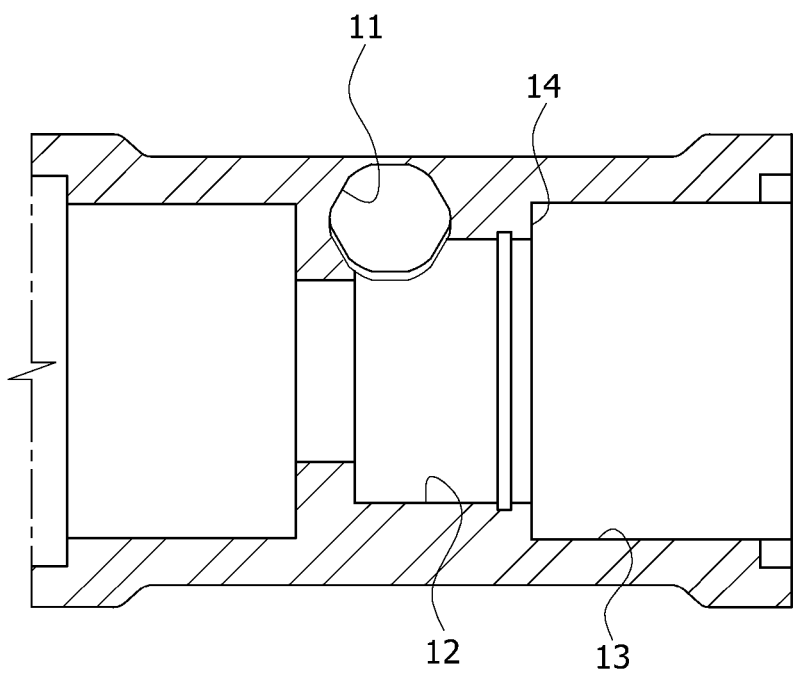
FIG. 2 is a diagram schematically illustrating a housing unit of the EPB apparatus in accordance with the exemplary embodiment of the inventive concepts.

FIG. 2 is a diagram schematically illustrating the housing unit of the EPB apparatus in accordance with an exemplary embodiment. Referring to FIG. 1 and FIG. 2, the housing unit 10 in accordance with the present exemplary embodiment may include a motor mounting part 11, a gear mounting part 12 and a piston mounting part 13.

The motor mounting part 11 may cover the motor unit 20, and the gear mounting part 12 may cover the worm wheel gear unit 30 engaged with the motor unit 20. The piston mounting part 13 extended from both sides of the gear mounting part 12 may cover the piston unit 40.

The gear mounting part 12 may have a larger inner diameter than the piston mounting part 13, and such a difference in inner diameter there in between may form a stepped part 14. When the stepped part 14 is pressurized, the size of the motor mounting part 11 may be reduced to press the motor unit 20.

Figure 3:
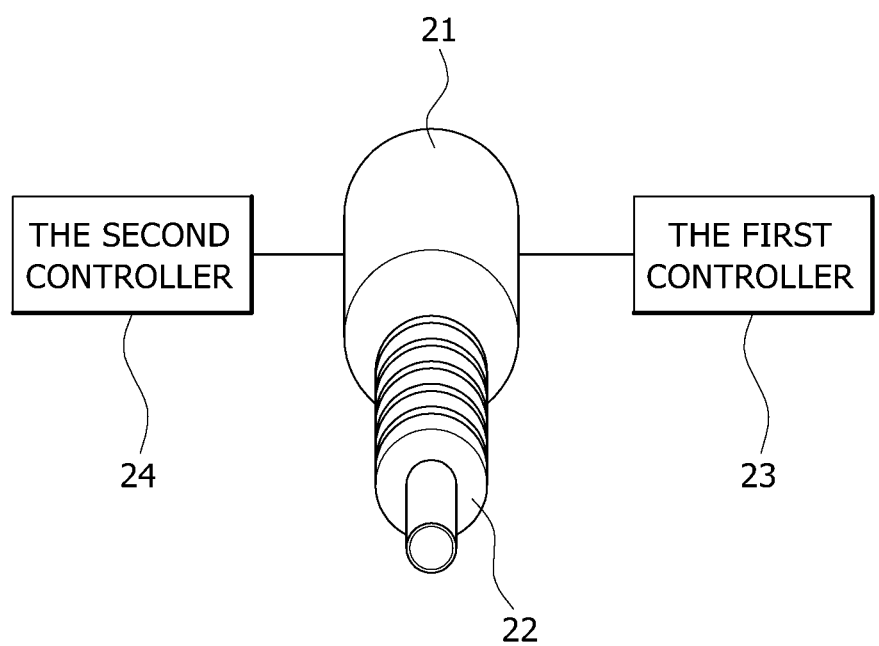
FIG. 3 is a diagram schematically illustrating a motor unit of the EPB apparatus in accordance with the exemplary embodiment of the inventive concepts.

FIG. 3 is a diagram schematically illustrating the motor unit of the EPB apparatus in accordance with an exemplary embodiment. Referring to FIG. 1 to FIG. 3, the motor unit 20 in accordance with an exemplary embodiment may include a motor driver 21 and a motor shaft 22. The motor driver 21 may be driven by power applied thereto, and rotate the motor shaft 22 in one direction or the other direction.

The motor shaft 22 may be formed in a worm gear shape and transmit power to the worm wheel gear unit 30. For example, the motor mounting part 11 may be formed in an angled shape to cover the motor shaft 22. Thus, when the stepped part 14 is pressurized, the angled motor mounting part 11 may press the motor shaft 22 to restrict the rotation of the motor shaft 22.

When the motor shaft 22 is rotated in one direction, the piston unit 40 may press the brake shoe 200 to set the parking brake. Then, when a parking brake release signal is applied, the motor driver 21 may be driven to rotate the motor shaft 22 in the other direction.

When the piston unit 40 is moved to pressurize the stepped part 14, the motor mounting part 11 may be deformed to pressurize the motor shaft 22, thereby restricting the rotation of the motor shaft 22.

As such, when the operation of the motor driver 21 is restricted, the motor driver 21 may be stopped to complete the release of the parking brake, according to control of a first controller 23. When the parking brake is released, the motor driver 21 may be driven at low power. However, when resistance is produced by the nut unit 50, the motor driver 21 may be driven at high power. When a difference occurs in power supplied to the motor driver 21, the first controller 23 may stop the operation of the motor driver 21.

When an error of the first controller 23 occurs, the motor driver 21 may not be stopped but continuously operated, even though the operation of the motor driver 21 needs to be restricted at the initial stage. In this case, parts may be damaged. In order to prevent such a problem, a driving time may be set for the motor driver 21.

If the motor driver 21 is driven for a time exceeding the set driving time, a fail safe function may be activated to forcibly stop the motor driver 21, in response to the control of the second controller 24. The first and second controllers 23 and 24 may be embodied by software for operating the motor driver 21.

Figure 4:
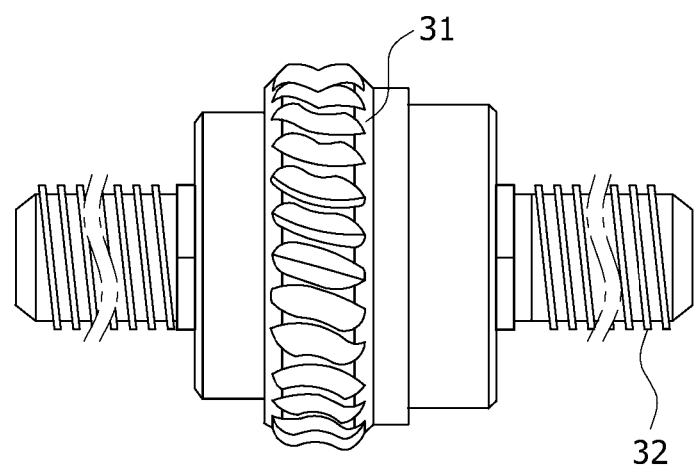
FIG. 4 is a diagram schematically illustrating a worm wheel gear unit of the EPB apparatus in accordance with the exemplary embodiment of the inventive concepts.

FIG. 4 is a diagram schematically illustrating the worm wheel gear unit of the EPB apparatus in accordance with an exemplary embodiment. Referring to FIG. 1 to FIG. 4, the worm wheel gear unit 30 in accordance with the exemplary embodiments may include a worm wheel body 31 and a worm wheel shaft 32.

The worm wheel body 31 may be positioned under the motor shaft 22, and engaged and rotated with the motor shaft 22. The worm wheel shaft 32 may be extended from both sides of the worm wheel body 31, and have a screw thread formed on the outer circumferential surface thereof.

Figure 5:
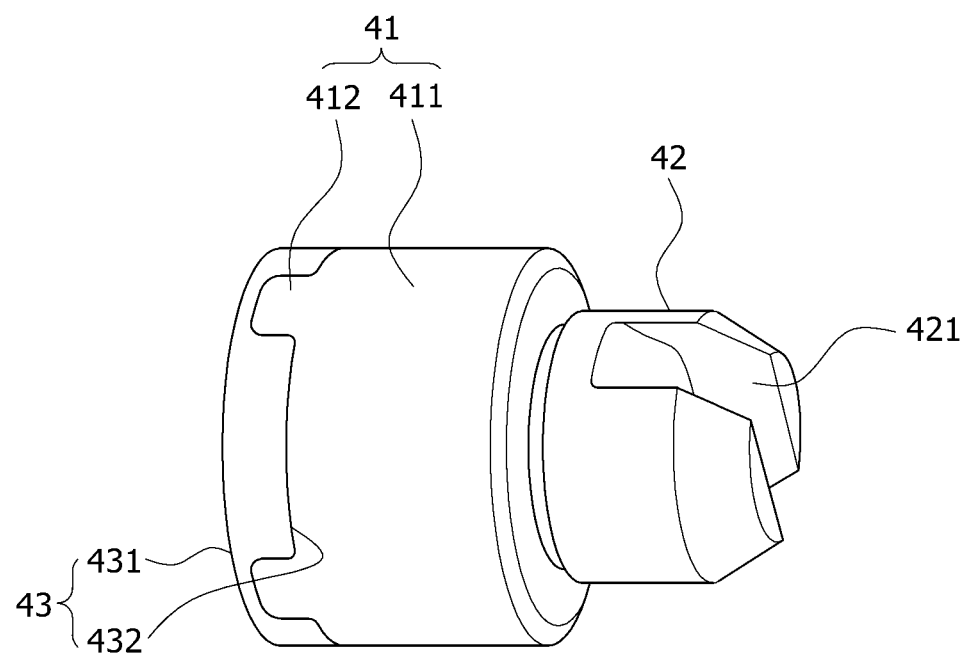
FIG. 5 is a diagram schematically illustrating a piston unit of the EPB apparatus in accordance with the exemplary embodiment of the inventive concepts.

FIG. 5 is a diagram schematically illustrating the piston unit of the EPB apparatus in accordance with an exemplary embodiment. Referring to FIG. 1 and FIG. 5, the piston unit 40 in accordance with the present exemplary embodiment may include a piston body part 41, a piston pressing part 42 and a piston lid part 43.

The piston body part 41 may have an opening formed at one side thereof, such that the nut unit 50 is embedded in the piston body part 41. For example, the piston body part 41 may include a body cylinder 411 formed in a cylindrical shape to cover the nut unit 50 and one or more body protrusions 412 formed at one end of the body cylinder 411.

The piston pressing part 42 may be formed at the other side of the piston body part 41, in order to press the brake shoe 200. For example, the piston pressing part 42 may protrude from the other end of the body cylinder 411, and the brake shoe 200 may be inserted into a pressing groove 421. When the brake shoe 200 is inserted into the pressing groove 421, the piston unit 40 may be constrained from rotating, and maintain the connection with the brake shoe 200.

The piston lid part 43 may partially cover the one side of the piston body part 41 and prevent a separation of the nut unit 50. For example, the piston lid part 43 may include a lid ring 431 and one or more lid protrusions 432.

The lid ring 431 may be formed in a ring shape such that the worm wheel shaft 32 is passed through the lid ring 431 and the nut unit 50 is locked to the lid ring 431. The lid protrusions 432 may protrude from the lid ring 431 so as to be inserted between the respective body protrusions 412.

The body protrusions 412 and the lid protrusions 432 may be press-fitted to maintain the connection there in between. The body protrusions 412 may have a smaller inner diameter than the body cylinder 411 such that the nut unit 50 embedded in the body cylinder 411 is locked to the body protrusions 412.

Figure 6:
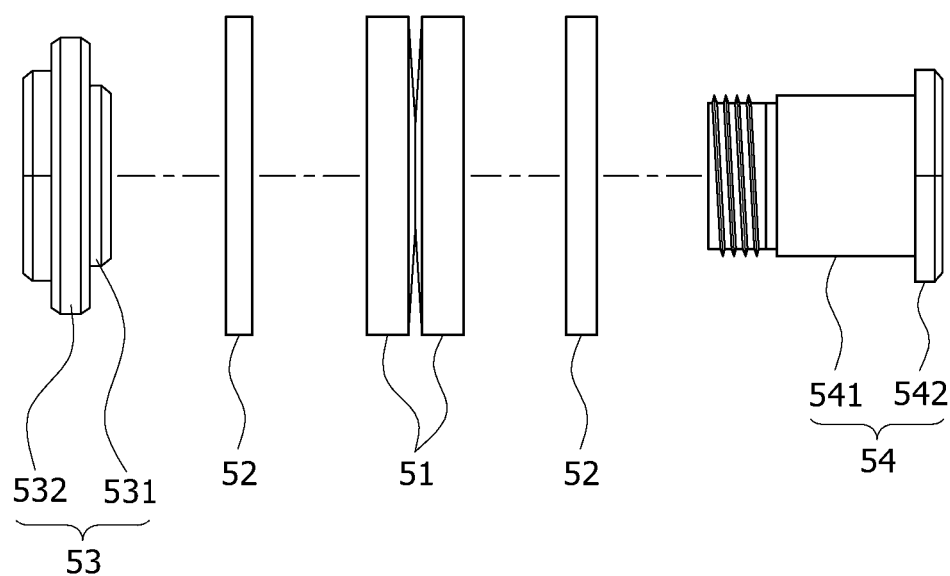
FIG. 6 is a diagram schematically illustrating a nut unit of the EPB apparatus in accordance with the exemplary embodiment of the inventive concepts.

FIG. 6 is a diagram schematically illustrating the nut unit of the EPB apparatus in accordance with an exemplary embodiment. Referring to FIG. 1 and FIG. 6, the nut unit 50 in accordance with the present exemplary embodiment may include a pair of spring parts 51, a pair of plate parts 52, a nut support part 53 and a nut coupling part 54.

The pair of spring parts 51 may be disposed so as to face each other. The spring parts 51 may produce an elastic restoring force while being pressed against each other by an external force. For example, the spring parts 51 may include a pair of ring-shaped disk springs which are pressed against each other by an external force.

When the parking brake is being operated, the spring parts 51 may store energy while being pressed. Although the brake shoe 200 is moved, the elastic restoring force of the spring parts 51 may allow the piston unit 40 to continuously press the brake shoe 200.

When the parking brake is released, the spring parts 51 may be pressed to store energy. Thus, until the motor driver 21 is stopped by the first controller 23 or the second controller 24, part damage can be suppressed.

The plate parts 52 may be disposed at both sides of the spring parts 51. For example, the plate parts 52 may be formed in a ring shape, and pressed against the respective spring parts 51 so as to transmit the external force.

The nut support part 53 may support any one of the plate parts 52. For example, the nut support part 53 may include a support body 531 and a support plate 532. The support body 531 may be inserted into one of the plate parts 52 and have a screw thread formed on the inner surface thereof, and the support plate 532 may be extended from the outer circumferential surface of the support body 531 so as to be adjacent to the plate part 52.

The nut coupling part 54 may support the other one of the plate parts 52. Furthermore, the nut coupling part 54 may be coupled to the nut support part 53 through the pair of plate parts 52 and the pair of spring parts 51, and screwed to the worm wheel gear unit 30 so as to move in the axial direction of the worm wheel gear unit 30.

For example, the nut coupling part 54 may include a coupling penetration part 541 and a coupling locking part 542. The coupling penetration part 541 may be passed through the pair of spring parts 51 and the pair of plate parts 52. The coupling penetration part 541 may have a screw thread formed on the outer surface thereof, and may be screwed to the support body 531.

The coupling penetration part 541 may have a screw thread formed on the inner surface thereof such that the worm wheel shaft 32 is screwed to the coupling penetration part 541. The coupling locking part 542 may protrude from the coupling penetration part 541 so as to be locked to the plate part 52.

Figure 7:
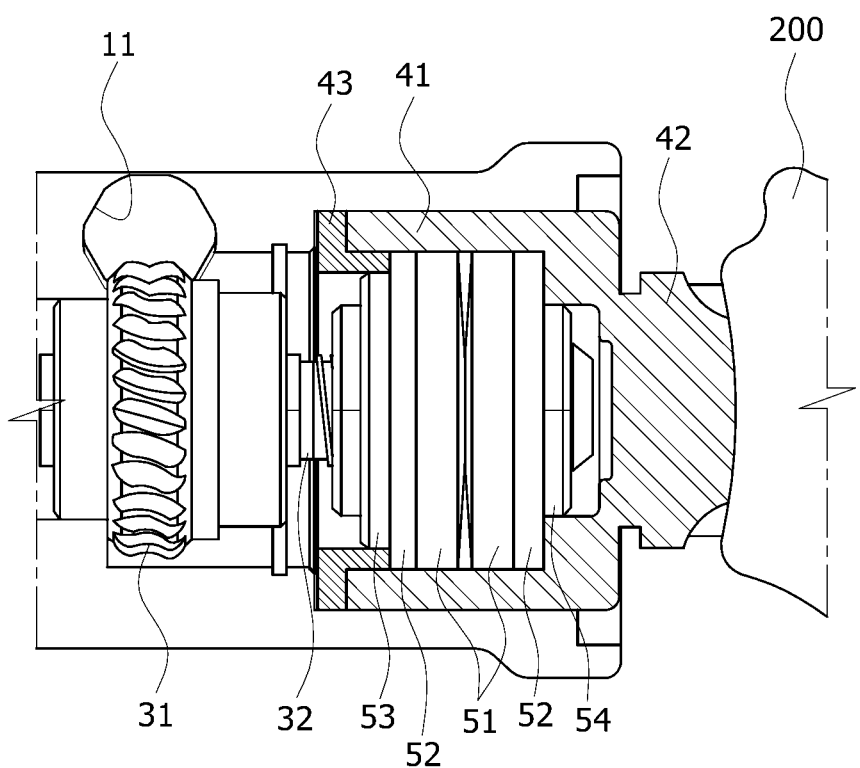
FIG. 7 is a diagram schematically illustrating the initial state of the EPB apparatus in accordance with the exemplary embodiment of the inventive concepts.
Figure 8:
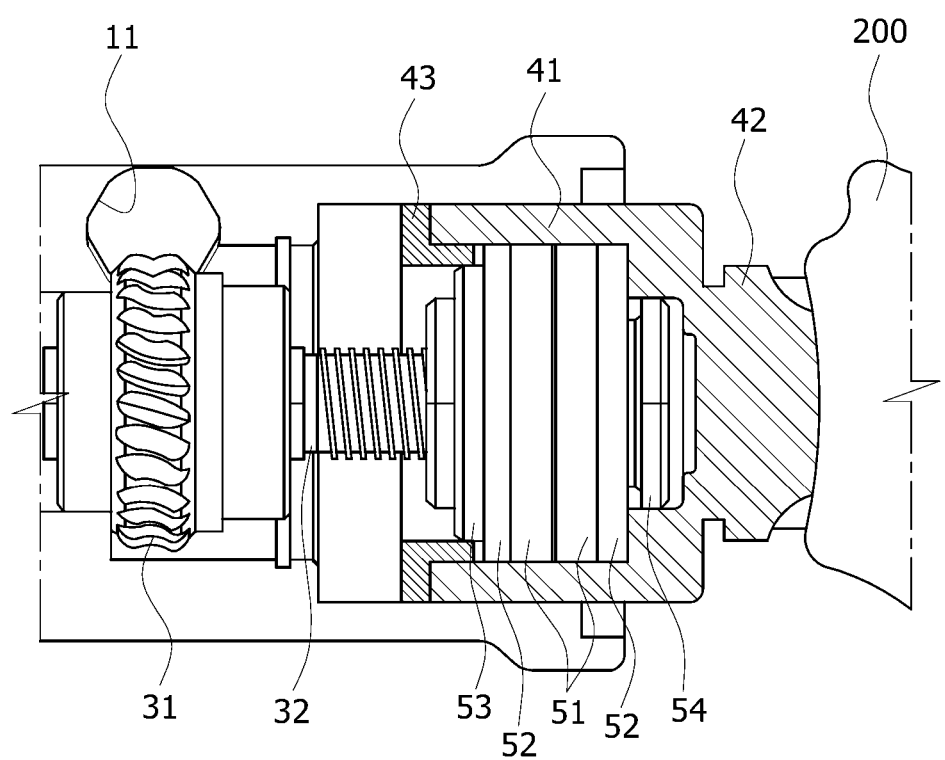
FIG. 8 is a diagram schematically illustrating a parking brake operation state of the EPB apparatus in accordance with the exemplary embodiment of the inventive concepts.
Figure 9:
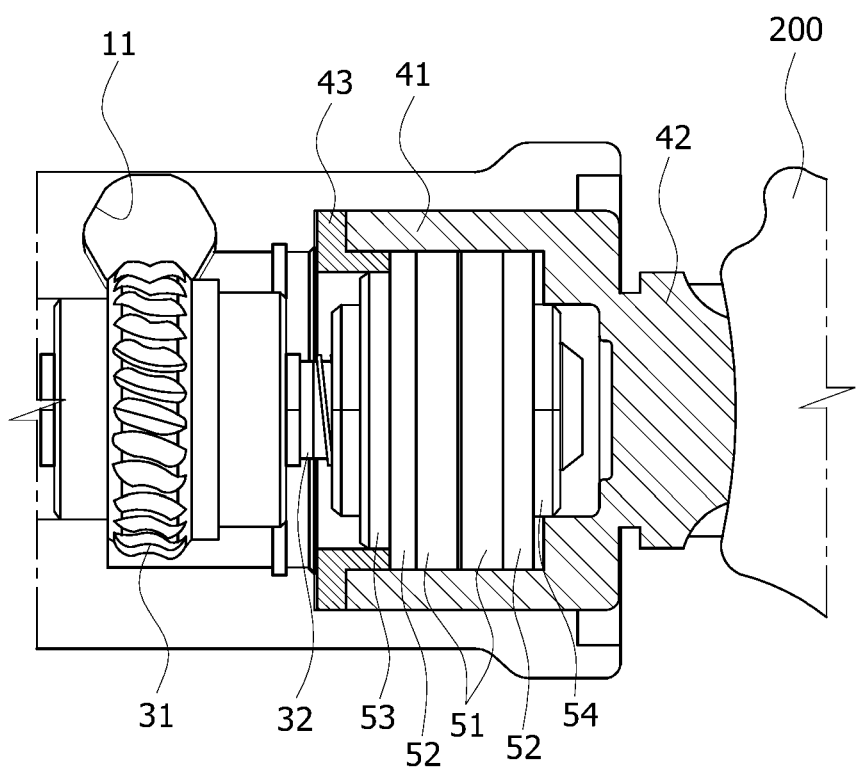
FIG. 9 is a diagram schematically illustrating a parking brake release state of the EPB apparatus in accordance with the exemplary embodiment of the inventive concepts.

FIG. 7 is a diagram schematically illustrating the initial state of the EPB apparatus in accordance with an exemplary embodiment. FIG. 8 is a diagram schematically illustrating a parking brake operation state of the EPB apparatus in accordance with an exemplary embodiment. FIG. 9 is a diagram schematically illustrating a parking brake release state of the EPB apparatus in accordance with an exemplary embodiment.

When the parking brake signal is generated in the initial state (refer to FIG. 7), the motor unit 20 may be driven to move the nut unit 50 toward the brake shoe 200. Then, the piston unit 40 may push the brake shoe 200 to set the parking brake (refer to FIG. 8). Then, when the parking brake release signal is generated, the parking brake may be returned to the initial state.

Hereafter, the operation of the EPB apparatus 1 having the above-described structure in accordance with an exemplary embodiment will be described as follows.

While the parking brake is not operated, the worm wheel gear unit 30 may be engaged with the motor unit 20, and the piston unit 40 having the nut unit 50 embedded therein may be disposed at both sides of the worm wheel gear unit 30 (refer to FIG. 7). At this time, the spring parts 51 may produce no elastic restoring force.

When the parking brake signal is generated in the above-described state, the worm wheel gear unit 30 engaged with the motor unit 20 may be rotated in one direction, and the nut unit 50 may be moved along the worm wheel shaft 32 of the worm wheel gear unit 30 such that the piston unit 40 pushes the brake shoe 200 (refer to FIG. 8).

In this example, the pair of spring parts 51 may be compressed to transmit a force to the piston unit 40. Thus, although the brake shoe 200 is moved afterwards, the piston unit 40 can continuously press the brake shoe 200 using the restoring force stored in the spring parts 51.

When the parking brake release signal is generated, the worm wheel gear unit 30 may be rotated in the other direction, and the nut unit 50 may be moved along the worm wheel shaft 32 of the worm wheel gear unit 30 such that the piston unit 40 pressurizes the stepped part 14 formed at the boundary between the gear mounting part 12 and the piston mounting part 13 (refer to FIG. 9). In this example, the pair of spring parts 51 may be compressed to transmit a force to the piston unit 40.

When the stepped part 14 is pressurized, a load may be generated in the motor unit 20 while the size of the motor mounting part 11 is reduced. In this case, the load may restrict the rotation of the motor shaft 22. When the motor shaft 22 is not smoothly rotated due to the load, the first controller 23 may stop the operation of the motor driver 21. For example, when a second current higher than a first current value set for a normal operation of the motor shaft 22 is supplied, the operation of the motor driver 21 may be stopped.

When an error of the first controller 23 occurs, the motor driver 21 may not be stopped but continuously driven, thereby causing part damage. In order to prevent such a problem, the second controller 24 may forcibly stop the operation of the motor driver 21, the second controller 24 performing the fail safe function when the motor driver 21 is driven for a time exceeding the preset driving time.

Although the nut unit 50 presses the piston unit 40 when the motor unit 20 is overloaded during the parking brake release, the pair of spring parts 51 may be compressed to perform a buffering function, thereby preventing the damage of the parts.

In the EPB apparatus 1 in accordance with an exemplary embodiment, when the motor driver 21 is overloaded, the operation of the motor driver 21 may be stopped according to control of the first controller 23.

In the EPB apparatus 1 in accordance with the present exemplary embodiment, even if an operation error of the first controller 23 occurs, the second controller 24 may forcibly stop the operation of the motor driver 21 when the motor driver 21 is driven for a time exceeding the preset driving time, thereby preventing the damage of the parts.

The EPB apparatus 1 in accordance with the present exemplary embodiment can stop the operation of the motor unit 20 even though a separate sensor is not used when the parking brake is released. Thus, the EPB apparatus 1 can reduce the manufacturing cost and the weight.

In the EPB apparatus 1 in accordance with the present exemplary embodiment, the spring parts 51 of the nut unit 50 may store energy while being pressed against each other by an external force. Thus, the piston unit 40 can be continuously pressed when the parking brake is operated, and part damage can be suppressed when the parking brake is released.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An electronic parking brake apparatus, comprising: a housing unit;
   a motor unit mounted in the housing unit;
   a gear unit engaged and configured to be rotated with the motor unit;
   a brake shoe;
   a piston unit configured to apply pressure to the brake shoe; and
   a nut unit mounted on the gear unit, coupled to the piston unit, and configured to be moved by rotation of the gear unit to pressurize the piston unit,
   wherein the nut unit comprises:
   one or more spring parts; and
   a nut coupling part supporting the one or more spring parts,
   wherein the nut coupling part is connected to the gear unit to move in an axial direction of the gear unit,
   a pair of plate parts comprising a first plate part and a second plate part; and
   a nut support part supporting the first plate part,
   wherein the one or more spring parts is disposed in and compressed between the pair of plate parts,
   wherein the nut coupling part supports the second plate part.

2. The apparatus of claim 1, wherein the housing unit further comprises:
   a motor mounting part covering the motor unit;
   a gear mounting part covering the gear unit; and
   a piston mounting part extending from the gear mounting part and covering the piston unit.

3. The apparatus of claim 2, wherein the motor mounting part further comprises an inner surface, and the inner surface has an angled shape.

4. The apparatus of claim 2 further comprising a stepped part, wherein the gear mounting part has a smaller inner diameter than an inner diameter of the piston mounting part, and the stepped part is formed between the gear mounting part and the piston mounting part, and formed by a difference in inner diameters between the gear mounting part and the piston mounting part.

5. The apparatus of claim 1, wherein the motor unit further comprises:
   a motor driver, wherein the motor driver is mounted in the housing unit;
   a motor shaft, wherein the motor shaft rotates when a current is applied to the motor driver, and transmits power to the gear unit; and
   a first controller, wherein the first controller is configured to stop the operation of the motor driver when the current is equal to or more than a preset current value.

6. The apparatus of claim 5, wherein the motor unit further comprises a second controller, wherein the second controller is configured to stop the operation of the motor driver when the first controller malfunctions.

7. The apparatus of claim 6, wherein the second controller stops the operation of the motor driver when the motor driver is driven for a time exceeding a preset driving time.

8. The apparatus of claim 1, wherein the gear unit further comprises two sides, and the piston unit is disposed at one side of the gear unit.

9. The apparatus of claim 1, wherein the one or more spring parts further comprise a pair of disk-springs, wherein the pair of disk-springs face each other and are pressed against each other by an external force.

10. The apparatus of claim 1, wherein the nut coupling part is coupled to the nut support part through the pair of plate parts and the one or more spring parts.

11. The apparatus of claim 1, wherein the nut coupling part further comprises:
    a coupling penetration part, wherein the coupling penetration part is installed through the one or more spring parts and the pair of plate parts, and coupled to the nut support part; and
    a coupling locking part, wherein the coupling locking part protrudes from the coupling penetration part to be in contact with the other one of the pair of plate parts.

12. The apparatus of claim 1, wherein the one or more spring parts compressed between the pair of plate parts are configured to apply pressure to the piston unit to apply pressure to the brake shoe.

13. The apparatus of claim 1, wherein the one or more spring parts compressed between the pair of plate parts are configured to perform a buffering function in response to the pressure to the brake shoe being released.

14. An electronic parking brake apparatus, comprising: a housing unit;
    a motor unit mounted in the housing unit;
    a gear unit engaged and configured to be rotated with the motor unit;
    a brake shoe;
    a piston unit configured to apply pressure to the brake shoe; and
    a nut unit mounted on the gear unit, coupled to the piston unit, and configured to be moved by rotation of the gear unit to pressurize the piston unit,
    wherein the piston unit further comprises:
    a piston body part, wherein the piston body part further comprises a first side and a second side, the piston body part is opened at the first side, and the nut unit is embedded inside the first side of the piston body part;
    a piston pressing part, wherein the piston pressing part is formed at the second side of the piston body part, wherein the piston pressing part presses the brake shoe; and
    a piston lid part, wherein the piston lid part is installed at the first side of the piston body part to prevent a separation of the nut unit,
    wherein the piston body part further comprises:
    a body cylinder, wherein the body cylinder further comprises a first end and a second end, the nut unit is embedded in the body cylinder; and
    a body protrusion, wherein the body protrusion is formed at the first end of the body cylinder and is engaged with the piston lid part.

15. The apparatus of claim 14, wherein the piston pressing part further comprises a pressing groove, the piston pressing part protrudes from the second end of the body cylinder, and the brake shoe is inserted into the pressing groove.

16. The apparatus of claim 14, wherein the piston lid part further comprises:
    a lid ring, wherein the gear unit passes through the lid ring, and the nut unit is locked to the lid ring; and a lid protrusion, wherein the lid protrusion is formed on the lid ring and coupled to the body protrusion.

* * * * *